(12) United States Patent
Picchi et al.

(10) Patent No.: US 8,732,563 B2
(45) Date of Patent: May 20, 2014

(54) METHOD FOR MAPPING AND DE-MAPPING OF NON-BINARY SYMBOLS IN DATA COMMUNICATION SYSTEMS

(75) Inventors: Ottavio Picchi, Middlesex (GB); Alain Mourad, Middlesex (GB); Ismael Gutierrez, Middlesex (GB)

(73) Assignee: Samsung Electronics Co., Ltd (KR)

( * ) Notice: Subject to any disclaimer, the term of this patent is extended or adjusted under 35 U.S.C. 154(b) by 312 days.

(21) Appl. No.: 13/157,743

(22) Filed: Jun. 10, 2011

(65) Prior Publication Data

US 2011/0307766 A1    Dec. 15, 2011

(30) Foreign Application Priority Data

Jun. 10, 2010 (GB) .................................. 1009729.3

(51) Int. Cl.
*H03M 13/00* (2006.01)
*G06F 11/00* (2006.01)

(52) U.S. Cl.
USPC .......................................... 714/781; 714/801

(58) Field of Classification Search
None
See application file for complete search history.

(56) References Cited

U.S. PATENT DOCUMENTS

| 7,095,780 | B2 * | 8/2006 | Nakamura et al. | 375/146 |
|---|---|---|---|---|
| 7,203,893 | B2 * | 4/2007 | Kerr et al. | 714/780 |
| 7,450,661 | B2 * | 11/2008 | Jeong et al. | 375/299 |
| 8,015,469 | B2 * | 9/2011 | Lim et al. | 714/752 |
| 2005/0025039 | A1 * | 2/2005 | Hwang et al. | 370/206 |
| 2005/0110663 | A1 * | 5/2005 | O'Shea et al. | 341/81 |
| 2005/0201476 | A1 * | 9/2005 | Kim et al. | 375/260 |
| 2005/0229091 | A1 * | 10/2005 | Narayanan et al. | 714/801 |
| 2008/0250305 | A1 | 10/2008 | Lim et al. | |
| 2009/0092148 | A1 | 4/2009 | Zhang et al. | |

FOREIGN PATENT DOCUMENTS

| KR | 1020010016793 | 3/2001 |
|---|---|---|
| KR | 1020060101039 | 9/2006 |

* cited by examiner

*Primary Examiner* — Daniel McMahon
(74) *Attorney, Agent, or Firm* — The Farrell Law Firm, P.C.

(57) ABSTRACT

A method of de-mapping non-binary Galois field symbols from physical layer code-words in a data communication system, in which at least one physical layer code-word includes portions mapped from more than one non-binary Galois field symbol is provided. The method includes calculating at least a provisional likelihood estimate for values of a first non-binary Galois field symbol having at least portions within a first physical layer code-word, the calculating including selecting a first number of values of a second non-binary Galois field symbol having at least portions within the first physical layer code-word, the first number forming a subset of the possible values of the second non-binary Galois field symbol.

34 Claims, 14 Drawing Sheets

FIG. 14

| Complexity | Pattern b) | Pattern c) |
|---|---|---|
| GF symbol "a" | $2^6 \times 2^6 \times 2^6 = 262144$ | $2^2 = 4$ |
| GF symbol "b" | $2^6 \times 2^6 \times 2^6 = 262144$ | $2^6 \times 2^4 = 1024$ |
| GF symbol "c" | $2^6 \times 2^6 \times 2^6 = 262144$ | $2^4 \times 2^6 = 1024$ |
| GF symbol "d" | $2^6 \times 2^6 \times 2^6 = 262144$ | $2^2 = 4$ |

FIG. 15

| Complexity | Pattern c) – Before | Pattern c) – After without iterations | Pattern c) – After with 2 iterations |
|---|---|---|---|
| GF symbol "a" | $2^2 = 4$ | $2^2 = 4$ | $2^2 = 4$ |
| GF symbol "b" | $2^6 \times 2^4 = 1024$ | $8 \times 2^4 = 128$ | $8 \times (2 \times 8) = 128$ |
| GF symbol "c" | $2^4 \times 2^6 = 1024$ | $2^4 \times 8 = 128$ | |
| GF symbol "d" | $2^2 = 4$ | $2^2 = 4$ | $2^2 = 4$ |

METHOD FOR MAPPING AND DE-MAPPING OF NON-BINARY SYMBOLS IN DATA COMMUNICATION SYSTEMS

PRIORITY

This application claims priority under 35 U.S.C. §119(a) to an application filed in the Intellectual Property Office of the United Kingdom on Jun. 10, 2010, and assigned Serial No. 1009729.3, the entire disclosure of which is incorporated herein by reference.

FIELD OF THE INVENTION

The present invention relates generally to data communications systems, and more specifically, although not exclusively, to a method and apparatus for mapping and de-mapping of non-binary Galois Field (GF) symbols to physical layer codewords in a communications system.

BACKGROUND OF THE INVENTION

The use of forward error correction codes, for example, turbo codes or Low Density Parity Check (LDPC) codes, is well known in data communication and, in particular, for wireless communication, to give improved performance in terms of bit error rate as a function of received Signal to Noise Ratio (SNR). Such codes may be binary codes, based on a series of binary code symbols, that is, symbols that may each have one of two values. Such symbols may be termed GF symbols, where the magnitude of the GF is 2, so that each symbol includes a single bit. Each bit is mapped to a physical layer code-word of the wireless system, such as a constellation symbol and/or a Multiple-Input Multiple-Output (MIMO) code-word, for transmission, and on reception, it is required to de-map received signals onto GF symbols. This mapping is straightforward in the case of binary codes.

Non-binary forward error correction codes have also been proposed, such as non-binary turbo codes and non-binary low density parity check codes. These are based on a series of GF symbols that may be transmitted with a value selected from more than two values, that is, the symbols are GF symbols with a GF of magnitude greater than 2. This may give higher performance in terms of error protection than conventional binary codes. A GF symbol may, for example, have 64 potential states, so that the symbol may be represented by 6 bits (i.e., $2^6$). However, the mapping and de-mapping of GF symbols to and from physical layer code-words may be complex and problematic.

For soft decision decoding of a binary code, each received GF symbol of a transmitted forward error correction code-word is typically given an associated likelihood estimate, that is, a likelihood that the symbol was transmitted with a particular binary state, based on properties of the received signal. A likelihood is associated with a degree of confidence in the state of a symbol. Not all symbols will be received with the same confidence, due, to, for example, propagation conditions of radio signals and/or noise and interference conditions at a receiver. Improved error correction performance may be realized by taking into account the likelihood of each state of each symbol in the decoding of the forward error correction code.

Soft decision decoding of non-binary codes typically requires a number of likelihood estimates per symbol that is equal to the number of possible states of the symbol. A likelihood estimate, and, in particular, a Log Likelihood Estimate (LLE), may, for example, be derived from the comparison of a received signal vector with locations on a grid of constellation points used for the detection of a constellation symbol, that is, a Euclidean distance.

Mapping and de-mapping of non-binary codes to the physical layer (specifically, to physical layer code-words) may result in complexity, particularly in terms of de-mapping at the receiver that may be prohibitive.

In the case of a one-to-one correspondence between the number of bits representing a GF symbol and a physical layer code-word, typically one distance is required to be calculated in determining each likelihood estimate for decoding a GF symbol. For other relationships, multiple Euclidean distances may need to be calculated for each Log Likelihood Estimate (LLE) and the de-mapping process may be computationally demanding. However it may be limiting in terms of physical implementation to restrict the relationship to a one-to-one correspondence.

SUMMARY OF THE INVENTION

According to a first aspect of the present invention, a method of de-mapping non-binary GF symbols from physical layer code-words in a data communication system is provided, in which at least one physical layer code-word includes portions mapped from more than one non-binary GF symbol, the method including calculating at least a provisional likelihood estimate for values of a first non-binary GF symbol having at least portions within a first physical layer code-word, the calculating being including selecting a first number of values of a second non-binary GF symbol including at least portions within the first physical layer code-word, the first number forming a subset of the possible values of the second non-binary GF symbol.

An advantage of selecting a subset of the possible values of the second non-binary GF as a basis for calculating the provisional likelihood estimates for values of the first GF symbol is that a number of Euclidean distances required in making a calculation of a likelihood estimate for values of the first GF symbol is reduced, as only the Euclidean distances associated with the subset are typically used. The physical layer code-word may, for example, be a Multiple-Input Multiple-Output (MIMO) code-word or a constellation symbol such as a Quadrature Amplitude Modulation (QAM) symbol. A Euclidean distance may be the length of a vector between a received signal vector and a candidate value of a physical layer code-word. The distance may be used jointly for decoding of a non-binary forward error correction code-word and, also, for maximum likelihood detection in a MIMO scheme, that is, that the Euclidean distances are derived using a maximum likelihood detector. The selection of the subset of possible values of the second non-binary GF may, for example, be a selection of the most likely values if such values are known, or may be a pseudo-random or predetermined selection if the most likely values are not known. Even a random or arbitrary selection may be better than an exhaustive search, in terms of processing power requirements, when used as a step in a system that successively refines the estimates of the likelihoods of GF values. The resulting likelihood estimates from such an iterative process, successively refining the likelihood estimates of value of symbols sharing a physical layer code-word, may be almost as accurate as estimates based on an exhaustive search method, but may be less computationally intensive.

In an embodiment of the invention, the likelihood estimates are derived including distances derived using a maximum likelihood detector, which is an efficient way to derive the distances, which may be required for both detecting in a MIMO system and for decoding of non-binary forward error correction words that comprise GF symbols.

In accordance with a second aspect of the invention, there is provided a receiving apparatus for de-mapping non-binary Galois field symbols from physical layer code-words in a data communication system, in which at least one physical layer code-word comprises parts mapped from more than one non-binary Galois field symbol, the apparatus comprising:

a Multiple-Input Multiple-Output (MIMO) detector and demapper configured for calculating at least a provisional likelihood estimate for values of a first non-binary Galois field symbol having at least portions within a first physical layer code-word, the calculating including selecting a first number of values of a second non-binary Galois field symbol having at least portions within the first physical layer code-word, the first number forming a subset of the possible values of the second non-binary Galois field symbol.

In accordance with a third aspect of the invention there is provided a method of mapping non-binary GF symbols onto constellation symbols in a data communication system, each constellation symbol having an In-phase and Quadrature component, the method including:

allowing the mapping of at least a part of each of a plurality of non-binary GF symbol onto one constellation symbol; and when mapping of at least a part of each of a first non-binary GF symbol and a second non-binary GF symbol onto a given constellation symbol, controlling the mapping to ensure that the at least a part of the first non-binary GF symbol and the at least a part of the second non-binary GF symbol are not both mapped onto a given In-phase or Quadrature component of the given constellation symbol.

This has an advantage of allowing flexibility in the choice of GF size and constellation symbol size, for example at the system design stage, while avoiding a mapping that may degrade performance, and in particular degrade performance in terms of bit error rate of a forward error correction process as a function of signal to noise ratio. Mapping of portions of more than one GF symbol onto the same In-phase or Quadrature component of a constellation symbol may cause such a degradation. This may be due to a correlation of noise or fading effects between GF symbols that share the same In-phase or Quadrature portions of a constellation symbol that may cause multiple GF symbol errors for one noise or fading event. Such correlated errors between symbols may be less effectively corrected by a forward error correction code than uncorrelated errors between symbols.

In an embodiment of the invention, a diversity cell is defined in terms of spatial, polarisation, time or frequency diversity.

In accordance with a fourth aspect of the invention, there is provided a transmitting apparatus for mapping non-binary Galois field symbols onto constellation symbols in a data communication system, each constellation symbol having an In-phase and Quadrature component, the apparatus comprising:

a mapper configured for allowing the mapping of at least a part of each of a plurality of non-binary Galois field symbol onto one constellation symbol, and when mapping of at least a part of each of a first non-binary Galois field symbol and a second non-binary Galois field symbol onto a given constellation symbol, controlling the mapping to ensure that the at least a part of the first non-binary Galois field symbol and the at least a part of the second non-binary Galois field symbol are not both mapped onto a given In-phase or Quadrature component of the given constellation symbol.

In accordance with a fifth aspect of the invention there is provided a method of mapping non-binary GF symbols onto physical layer code-words in a data communication system, the method including:

allowing the mapping of at least a part of each of three or more non-binary GF symbols onto two constellation symbols; and when mapping of at least a part of each of the second non-binary GF symbol and a third non-binary GF symbol onto a further constellation symbol, controlling the mapping to ensure that the at least a part of the second non-binary GF symbol and the at least a part of the third non-binary GF symbol are not both mapped onto a given In-phase or Quadrature component of the further constellation symbol.

In an embodiment of the invention, the method includes setting the interleaver to a value which tends to limit the number of physical layer code-words onto which the non-binary GF symbol is mapped to a number of physical layer code-words less than half the number of bits in the non-binary GF symbol. This is found to be an advantageous trade-off between diversity performance and complexity of a de-mapper.

In an embodiment of the invention, the value defines a maximum number of physical layer code-words onto which the non-binary GF symbol is mapped. This is found to allow a convenient implementation.

In an embodiment of the invention, the value is set at two. This is found to be a particularly advantageous trade-off between diversity performance and complexity of a de-mapper.

In an embodiment of the invention, each of the physical layer code-words includes one or more constellation symbols.

In an embodiment of the invention, each of the physical layer code-words is a MIMO code-word.

According to a sixth aspect of the invention there is provided a transmitting apparatus arranged to conduct the method of the fifth aspect.

According to a seventh aspect of the invention there is provided a method of mapping non-binary GF symbols onto one or more diversity cells, the method including:

allowing the mapping of a non-binary GF symbol onto a plurality of diversity cells; and when there is an option to map a non-binary GF symbol onto a relatively low number of diversity cells or a relatively high number of diversity cells, preferentially mapping the non-binary GF symbol onto the relatively high number of diversity cells.

This has an advantage that performance may be improved in terms of error rate by exploiting diversity between propagation components with uncorrelated or partially de-correlated noise and/or fading characteristics.

In an embodiment of the invention, the diversity cells are cells of one or more MIMO code-words, the diversity cells being transmitted by two or more antennas, different diversity cells being transmitted by different antennas, and wherein the method includes preferentially mapping the non-binary GF symbol onto diversity cells transmitted by each of the two or more antennas.

In an embodiment of the invention, the diversity cells are defined in terms of spatial, polarisation, time or frequency diversity.

According to an eighth aspect of the invention, there is provided a transmitting apparatus for mapping non-binary Galois field symbols onto one or more diversity cells, the method comprising, the apparatus comprising:

a mapper configured for allowing the mapping of a non-binary Galois field symbol onto a plurality of diversity cells; and when there is an option to map a non-binary Galois field symbol onto a first number of diversity cells or a second number of diversity cells, preferentially mapping the non-binary Galois field symbol onto the second number of diversity cells, wherein the second number is greater than the first number.

Further features and advantages of the invention will be apparent from the following description of preferred embodiments of the invention, which are given by way of example only.

BRIEF DESCRIPTION OF THE DRAWINGS

The above and other features and advantages of the present invention will be more apparent from the following detailed description taken in conjunction with the accompanying drawings, in which:

FIG. 14 is a table comparing complexity of de-mapping for exemplary patterns; and FIG. 15 is a table illustrating complexity of de-mapping with a low complexity de-mapper with and without iterations.

DETAILED DESCRIPTION OF EMBODIMENTS OF THE PRESENT INVENTION

By way of example an embodiment of the invention will now be described in the context of digital wireless systems using non-binary Forward Error Correction (FEC) codes, such as non-binary Low Density Parity Check (LDPC) codes, and multiple antenna techniques, and in particular MIMO schemes. However, it will be understood that this is by way of example only and that other embodiments may involve other communication systems, and other non-binary coding schemes such as turbo coding. Embodiments are not limited to the use of a particular physical layer scheme, and are not restricted to use with MIMO physical layer schemes.

Non-binary codes (i.e. codes using a high-order a GF, that is, a GF including more than two values) have been recently researched and proposed to achieve higher error protection of transmission signals than conventional binary codes. Moreover, MIMO techniques have been proposed as key enablers to achieve high spectral efficiency and have been adopted in several advanced wireless communication systems (e.g., 3GPP LTE, WiMAX IEEE 802.16e/m, WiFi IEEE 802.11n).

Embodiments of the invention will be described that provide efficient mapping of non-binary GF symbols onto MIMO codewords together with a low complexity soft de-mapping technique. Unlike the conventional binary case, the mapping and de-mapping in the non-binary context has not been researched thoroughly especially when MIMO techniques are used. Effective solutions are thus needed to preserve the better performance of non-binary codes but at reasonable receiver complexity.

Figure 1:
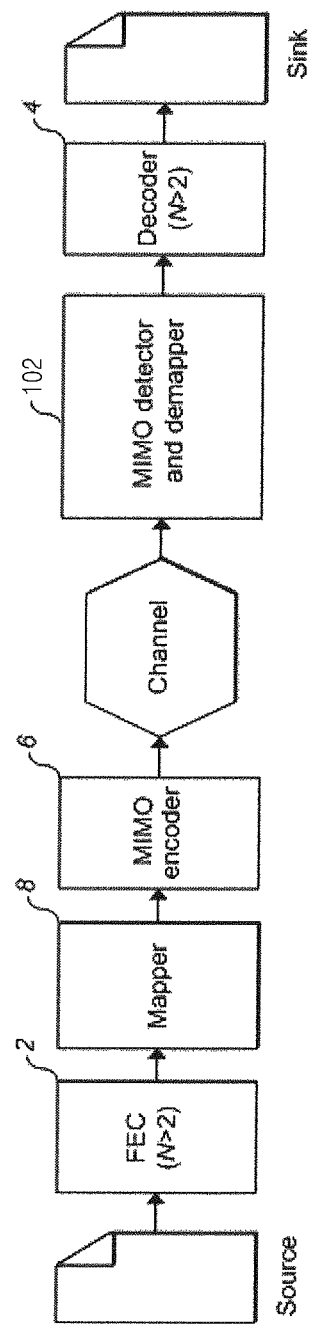
FIG. 1 is a schematic diagram illustrating a transmission chain in an embodiment of the invention.

FIG. 1 illustrates a basic transmission chain in an embodiment of the invention with non-binary FEC (i.e with GF order N>2) together with a MIMO encoder. The FEC coder 2 and decoder 4 (together described as a codec) and MIMO encoder 6 are known from the state of the art.

The FEC encoder 2 performs coding of the source information (usually represented in terms of bits) and outputs a non-binary codeword composed of GF symbols taking values in the range from 0 to N−1. It is noteworthy that in the conventional binary case where the GF order N is equal to 2, the FEC codeword remains binary (with values equal to 0 or 1).

Figure 2:
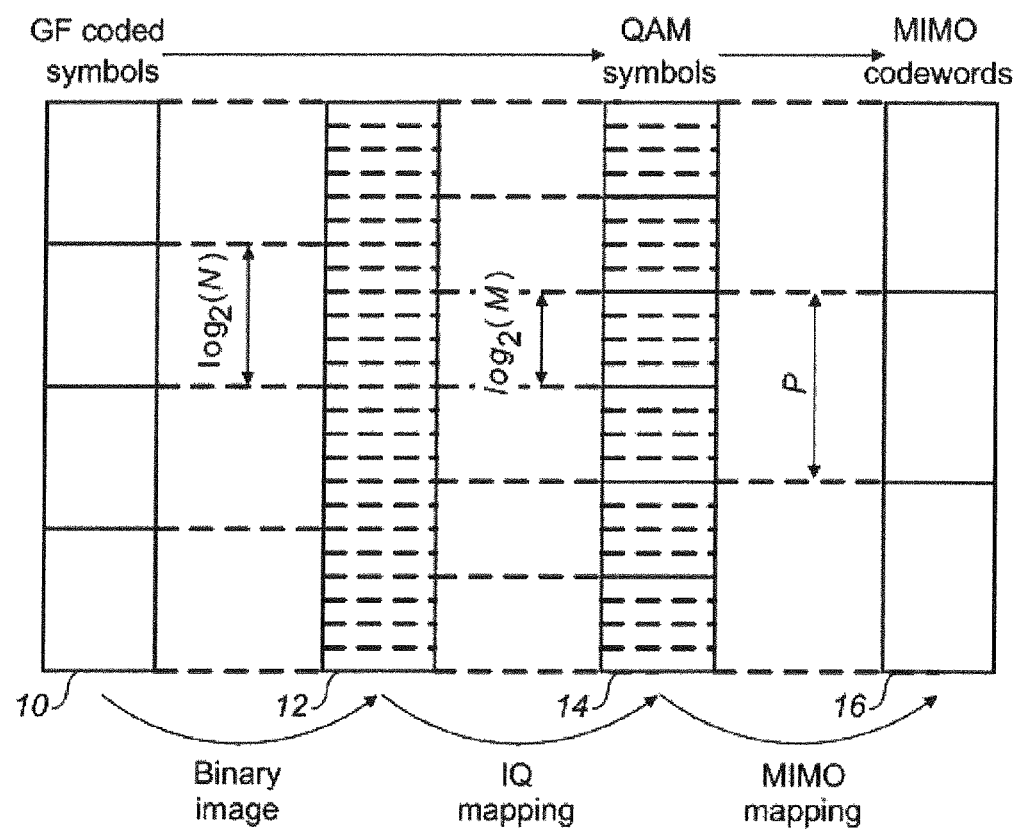
FIG. 2 is a schematic diagram illustrating a mapping scheme according to an embodiment of the invention.

The role of the Mapper 8 is to map the GF coded symbols 10 at the output of the FEC encoder 2 to the MIMO codewords 16, as illustrated in FIG. 2. The three main steps in this embodiment of the invention are as follows. First, binary images 12 of GF symbols 10 are formed, where each GF symbol maps to log 2(N) bits. The parameter N stands for the GF order (e.g. N=64 for GF(64)). Second, the binary images 12 of GF symbols are mapped onto In-phase (I) and QQuadrature (Q) components of Quadrature Amplitude Modulation (QAM) symbols 14, where each QAM symbol carries log 2(M) bits. The parameter M stands for the QAM constellation order (e.g. M=4 for QPSK, M=16 for 16QAM). Thirdly, the QAM symbols 14 are mapped onto MIMO code-words 16, where each MIMO codeword carries P QAM symbols. The parameter P stands for the number of QAM symbols transmitted within the same MIMO codeword.

As shown in FIG. 2, depending on the set of parameters (N, M, P), one GF symbol does not necessarily map onto one QAM symbol or later onto one MIMO codeword. This has a direct impact on the MIMO detector and de-mapper 102 at the receiver side, especially when it comes to the use of optimal joint Maximum Likelihood (ML) MIMO detector and de-mapper. An embodiment of the invention thus uses a mapping that achieves very good performance together with much lower complexity by using a maximum likelihood detector, such as a joint ML MIMO detector and de-mapper at the receiver. This is described as follows.

Table 1 shows the notations are used in the description of embodiments of the invention:

TABLE 1

| Parameter | Description |
| --- | --- |
| N | GF order (default value = 64) |
| M | QAM constellation order (e.g. QPSK → M = 4; 16QAM → M = 16, etc.) |
| $m_1$ | Minimum integer number of GF symbols which map to a minimum integer number $m_2$ of QAM symbols |
| $m_2$ | Minimum integer number of QAM symbols which map to a minimum integer number $m_1$ of GF symbols |

TABLE 1-continued

| Parameter | Description |
| --- | --- |
| Ntx | Number of transmit antennas (default value = 2) |
| Nrx | Number of receive antennas (default value = 2) |
| P | Number of QAM symbols into one MIMO codeword |
| $n_1$ | Minimum integer number of GF symbols which map to a minimum integer number $n_2$ of MIMO codewords |
| $n_2$ | Minimum integer number of MIMO codewords which map to a minimum integer number $n_1$ of GF symbols |

Figure 3:
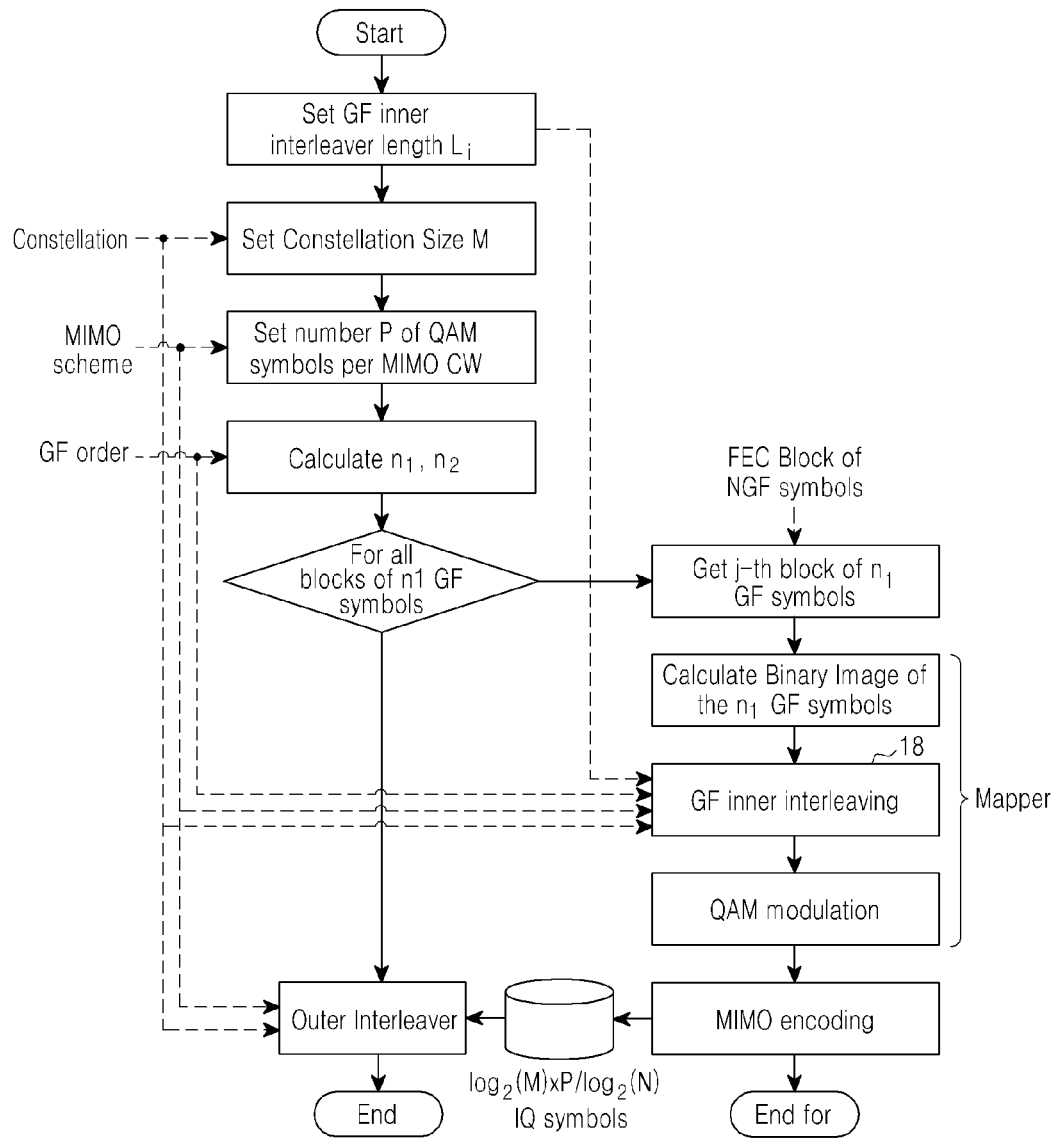
FIG. 3 is a flow diagram illustrating operation of a transmitter according to an embodiment of the invention.

FIG. 3 depicts an example of a flowchart of operations on the transmitter side. An important block introduced in an embodiment of the invention at the transmitter side is the GF inner interleaving 18.

There are typically two key parameters to be considered for the mapping of the binary images of the GF symbols to the IQ components of QAM symbols, as may be carried within the MIMO code-words: the error performance (related to diversity gain) and the complexity of the joint ML detector and soft de-mapper at the receiver side.

An inner interleaver depth $L_i$ may be defined, the value of which may be set according to the degree of complexity tolerated at the receiver side for the soft ML joint detector and de-mapper. This parameter typically indicates the maximum number of MIMO code-words spanned by the binary image of one GF symbol (the binary image of a GF symbol may itself be referred to as a GF symbol in the context of embodiments of the invention). This number may typically be set to its lowest possible value in order for the complexity of the joint ML detector and de-mapper to be reduced.

The GF inner interleaver 18 may map the binary images of the different GF symbols onto IQ components of the QAM symbols carried within $L_i$ MIMO code-words. Selectively, the GF inner interleaving 18 may be implemented by the mapper 8, or may be implemented by an inner interleaver (not shown) which is included in the mapper 8.

An embodiment of the invention may be designed by the application of three rules that give guidance in the design of the GF inner interleaver in order to achieve the best trade-off between performance and complexity.

According to an example of the first rule, the sub-portions of the binary image of the same GF symbol are mapped onto In-phase (I) and Quadrature (Q) components of constellation symbols, such as QAM symbols, so that the binary images of different GF symbols should where possible not multiplex, that is, not be mapped, within the same I or Q component. This rule may, for example, be applied to constellations where $m_1=1$ GF symbol for mapping onto the constellation symbols (e.g. QPSK and 64QAM) without needing to multiplex GF symbols within the same I or Q component. With $m_1>1$ (e.g. 16QAM, 256QAM), the rule may, in some embodiments, prevent multiplexing bits from different GF symbols into the same I or Q component; this is possible when the number of bits per GF symbol (log 2(N)) is a multiple of the number of bits per I or Q component (0.5*log 2(M)). Otherwise (e.g. with GF(64) and 256QAM), the rule maps as many I and Q components as possible to binary sub-portions issued from the binary image of only one single GF symbol. This feature ensures better performance compared to schemes not obeying to this rule.

An embodiment of the invention operating according to the first rule may operate as follows.

Mapping of at least a part of several non-binary GF symbols may be allowed onto one constellation symbol and, when mapping of at least a part of each of a first non-binary GF symbol and a second non-binary GF symbol onto a given constellation symbol, the mapping is controlled to ensure that the part of the first non-binary GF symbol and the part of the second non-binary GF symbol are not both mapped onto a given in-phase or Quadrature component of the given constellation symbol. So, mapping of portions of more than one GF symbol is prevented, in this embodiment, to at least one of the in-phase or Quadrature components of a constellation symbol. In an embodiment, mapping of more than one GF symbol is prevented to either component, where this is possible without leaving unused capacity on a component.

Typically, the first and second non-binary GF symbols form part of the same non-binary forward error correction code-word, as in this case it is particularly beneficial to avoid where possible mapping portions of the same non-binary forward error correction code-word onto the same in-phase or Quadrature component as this may cause correlated errors within the forward error correction code-word.

In the case of mapping of three or more non-binary GF symbols onto two constellation symbols, when mapping of at least a part of each of the second non-binary GF symbol and a third non-binary GF symbol onto a further constellation symbol, the mapping is controlled to ensure that part of the second non-binary GF symbol and part of the third non-binary GF symbol are not both mapped onto a given in-phase or Quadrature component of the further constellation symbol. So, it may be that the first and second GF symbols are mapped onto the two constellation symbols without mapping portions from different GF symbols onto the same in-phase or Quadrature component, and it is also ensured that portions of the second and third GF symbol are not mapped onto the same in-phase or Quadrature component of the further constellation symbol.

A particular case to which an embodiment of the invention applies is the case where each GF symbol is of a length which is greater than half of a length of a constellation symbol, that is, greater in length (in terms of number of bits) than an in-phase or Quadrature component of the constellation symbol, and in particular when the length of each GF symbol is of a length which is a multiple integral plus one half of a length of the given constellation symbol; in this latter case, each GF symbol may be mapped to in-phase and Quadrature components, filling the capacity of each component, so that the mapping may be applied without mapping portions from different GFs to the same component and without leaving unused capacity.

Considering an example of the application of the first rule, in a first case one GF symbol has a binary image or representation of a length that is a multiple integer +½ of the size of binary image of the constellation symbol, so that GF binary sub-portions may be fully mapped to I and Q components of multiple GF symbols. In a more general case, let K be the length of the GF symbol, L the half-length of the constellation symbol, then:

$$K = q*L + r$$

The quotient q represents how many I and Q components the GF symbol will map to. The remainder r will give how many bits will be carried in part of one I or Q component, so if r=0, then we have perfect mapping of GF symbol sub-portions to I and Q components (there is no mix at all of different GF symbols in the same I and Q component). Otherwise, if r>0, then one I or Q component will carry r bits from one GF symbol, whereas the remaining L-r will come from other GF symbols, so that there is a minor violation of the preference to avoid mixing portions from more than one GF symbol on any I or Q component, but this applies only in one I or Q component per GF symbol, which may not be of importance to the performance.

Taking an example of the values of the parameters $m_1$ and $m_2$ (as defined above), these depend on the GF order and QAM constellation order. Assuming GF order N=64, Table 2 below gives the values of $m_1$ and $m_2$ for QPSK, 16QAM, 64QAM, and 256QAM constellations.

TABLE 2

| Constellation | QPSK | 16QAM | 64QAM | 256QAM |
|---|---|---|---|---|
| $(m_1, m_2)$ | (1, 3) | (2, 3) | (1, 1) | (4, 3) |

Figure 4:
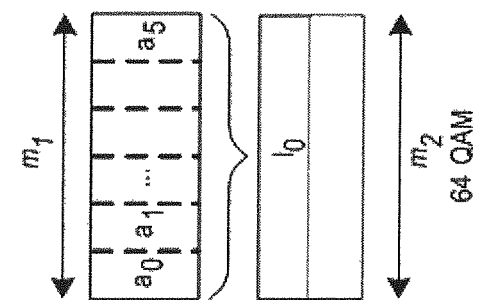
FIG. 4 is a schematic diagram illustrating mapping of Galois symbols in an embodiment of the invention.
Figure 4:
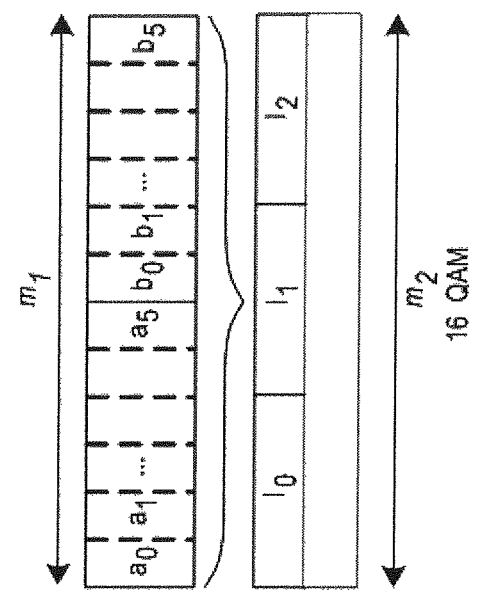
Figure 4:
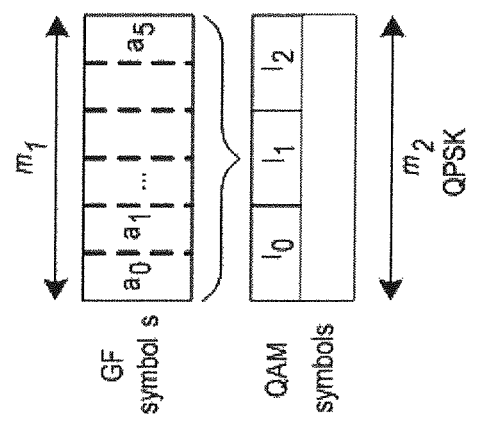

FIG. 4 illustrates the configurations of $(m_1, m_2)$ for QPSK, 16QAM, and 64QAM derived from the table above. In QPSK, one GF symbol maps onto six I and Q components of three QPSK symbols; in 16QAM, two GF symbols map onto six I and Q components of three 16QAM symbols; and finally in 64QAM, one GF symbol maps onto two I and Q components of one 64QAM symbol.

Figure 5:
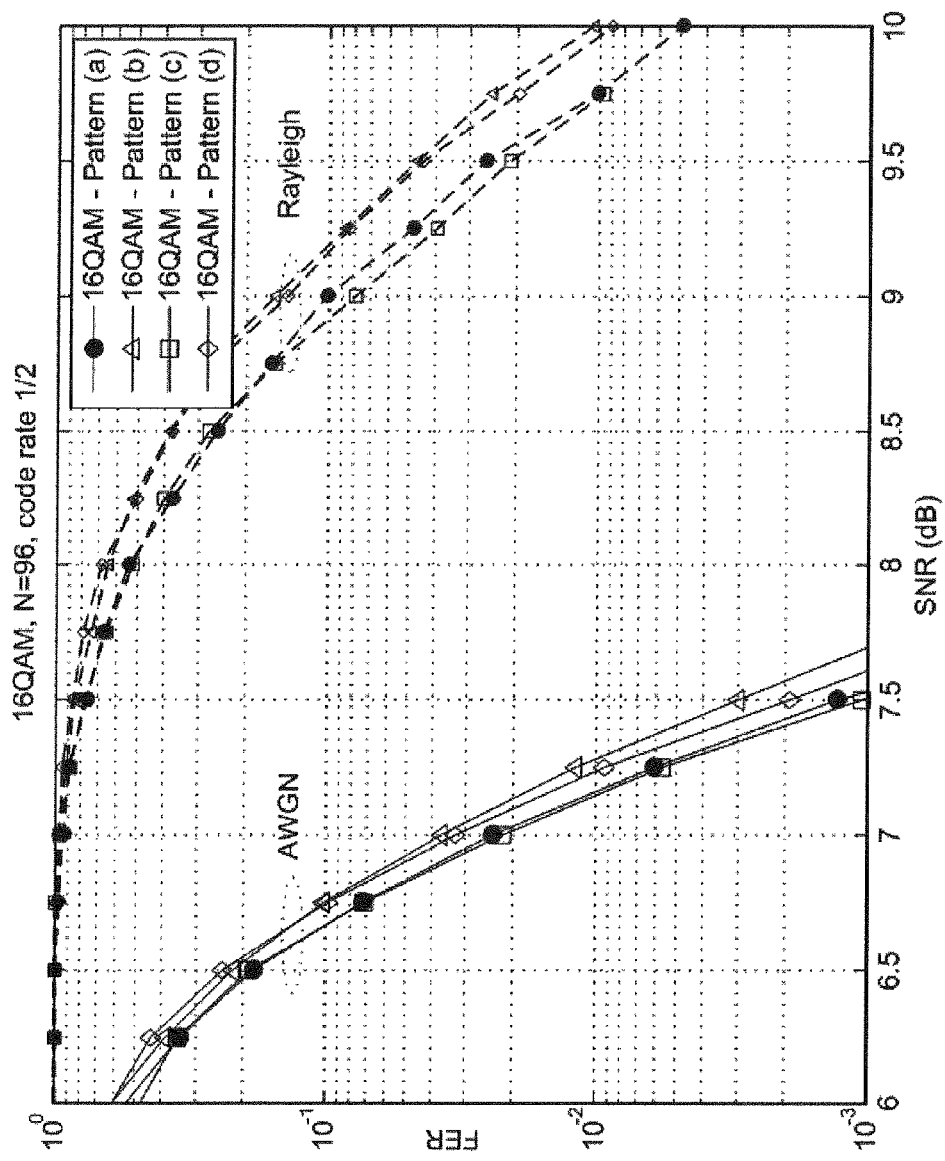
FIG. 5 is a graph illustrating error rate results for different mapping schemes.

FIG. 5 illustrates the performance achieved for 16QAM with four patterns as shown in Table 3 below.

TABLE 3

| No. | \multicolumn{6}{c}{Pattern} |
|---|---|---|---|---|---|---|

| No. | I0 | Q0 | I1 | Q1 | I2 | Q2 |
|---|---|---|---|---|---|---|
| (a) | a0 a1 | a2 a3 | a4 a5 | b0 b1 | b2 b3 | b4 b5 |
| (b) | a0 b0 | a1 b1 | a2 b2 | a3 b3 | a4 b4 | a5 b5 |
| (c) | a0 a1 | b0 b1 | a2 a3 | b2 b3 | a4 a5 | b4 b5 |
| (d) | a0 b0 | b1 a1 | a2 b2 | b3 a3 | a4 b4 | b5 a5 |

Results in FIG. 5 are shown over both Additive White Gaussian Noise (AWGN) and a Rayleigh channel, that is, a channel subject to Rayleigh fading. The results from FIG. 5 show a gain of nearly 0.25 dB for the patterns (a) and (c), relating to the first rule in the design of the GF inner interleaver. The same conclusions are obtained with other constellations such as QPSK or 64QAM.

It is noteworthy that pattern (c) shows a slight advantage compared to pattern (a) in the Rayleigh channel, which is justified by its higher diversity achieved within the GF symbol.

A version of the second rule involves the mapping of as many in-phase and/or Quadrature components as possible, derived from the same GF symbol, into the same MIMO codeword. The ML detector and de-mapper will then work over the minimum number of MIMO code-words for the computation of the LLR values of each GF symbol. This may allow for a lower complexity ML detector and de-mapper as described below. Reference here to a MIMO codeword may apply also to a physical layer code-word such as a constellation symbol.

An embodiment of the invention operating according to the second rule may operate as follows.

An interleaver 18 as shown in FIG. 3 performs the mapping and the interleaver is set to a value which tends to limit the number of physical layer code-words onto which a non-binary GF symbol is mapped to a number of physical layer code-words less than the number of bits in the non-binary GF symbol. It may be seen that the maximum number of physical layer code-words over which GF symbol could be spread is equal to the number of bits in the GF symbol; this simply corresponds to one bit per codeword. The interleaver thus operates to limit the number of physical layer code-words to less than this maximum number. There may otherwise be a motivation to use the maximum number in order to increase diversity. It has been found that it is particularly advantageous to limit the number of physical layer code-words over which portions of a GF are spread to less than half the number of bits in the non-binary GF symbol. The limit to the number of physical layer code-words over which portions of a GF are spread may be set in terms of a hard limit; a limit of two physical layer code-words has been found to be advantageous in an embodiment of the invention.

The second rule may of course be applied in conjunction with the first rule.

The third rule relates to the achievable diversity, which may for example be within the MIMO code-word. Where possible, the interleaver should map the in-phase and Quadrature components derived from the same GF symbol onto the diversity cells of the MIMO codeword which are likely to experience uncorrelated fading. This mapping allows for diversity gain inside the GF symbol thanks to the uncorrelated fading affecting the different sub-portions of the binary image of the GF symbol. A diversity cell may be defined in terms of spatial, polarisation, time or frequency diversity.

An embodiment of the invention operating according to the third rule may operate as follows.

Non-binary GF symbols are mapped onto one or more diversity cells, allowing the mapping a GF symbol onto at least two diversity cells. When there is an option to map the GF symbol onto a relatively low number of diversity cells or a relatively high number of diversity cells, the GF symbol is preferentially mapped onto the relatively high number of diversity cells.

So, for example, although the second rule suggests that a number of physical layer code-words, for example MIMO code-words, should be limited, it should also be the case, as suggested by the application of the third rule, that the number of diversity cells over which portions of a GF symbol are distributed should be as high as possible within a MIMO code-word. So for example, when the diversity cells are cells of one or more MIMO code-words, the diversity cells being transmitted by different antennas, the GF symbol should be mapped onto diversity cells transmitted by each of the two or more antennas.

Examples of mapping in view of the application of the first, second and third rules will be examined as follows, and performance of various embodiments will be considered. Taking some examples, the values of the parameters $n_1$ and $n_2$ (as defined above) depend on the GF order, QAM constellation order, and MIMO codeword size in use. Assuming GF order N=64 and MIMO codeword size P=2, Table 4 below gives the values of $n_1$ and $n_2$ for QPSK, 16QAM, and 64QAM constellations.

TABLE 4

| Constellation | QPSK | 16QAM | 64QAM |
|---|---|---|---|
| $(n_1, n_2)$ | (2, 3) | (4, 3) | (2, 1) |

Figure 6:
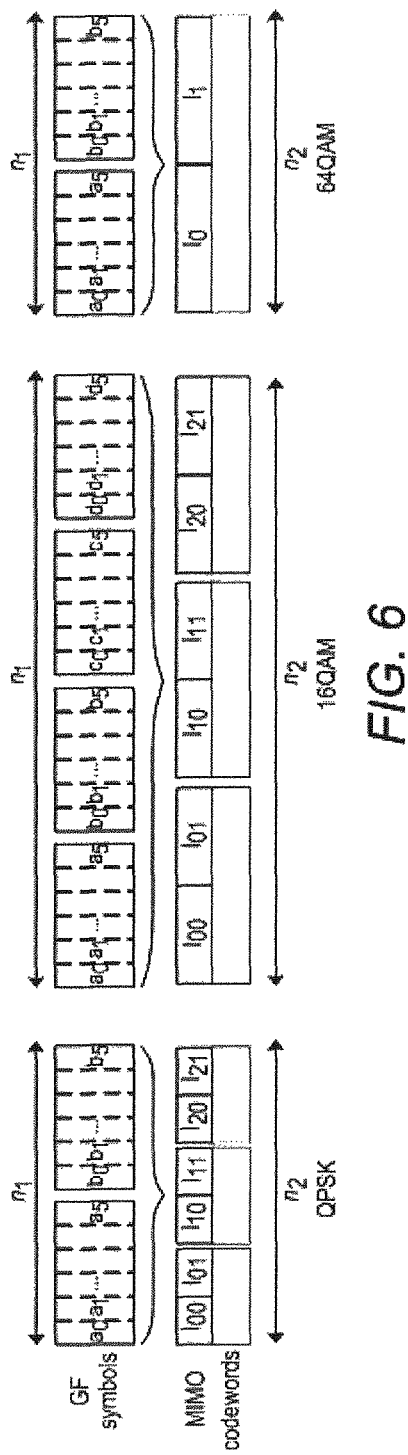
FIG. 6 is a schematic diagram illustrating mapping of Galois symbols in an embodiment of the invention.

FIG. 6 illustrates the configurations of $(n_1, n_2)$ for QPSK, 16QAM, and 64QAM derived from the table above. In QPSK, the I and Q components issued from the binary images of two GF symbols are mapped onto three MIMO code-words; in 16QAM, the I and Q components issued from the binary images of four GF symbols are mapped onto three MIMO code-words; in 64QAM, the I and Q components issued from the binary images of two GF symbols are mapped onto one MIMO codeword.

Figure 7:
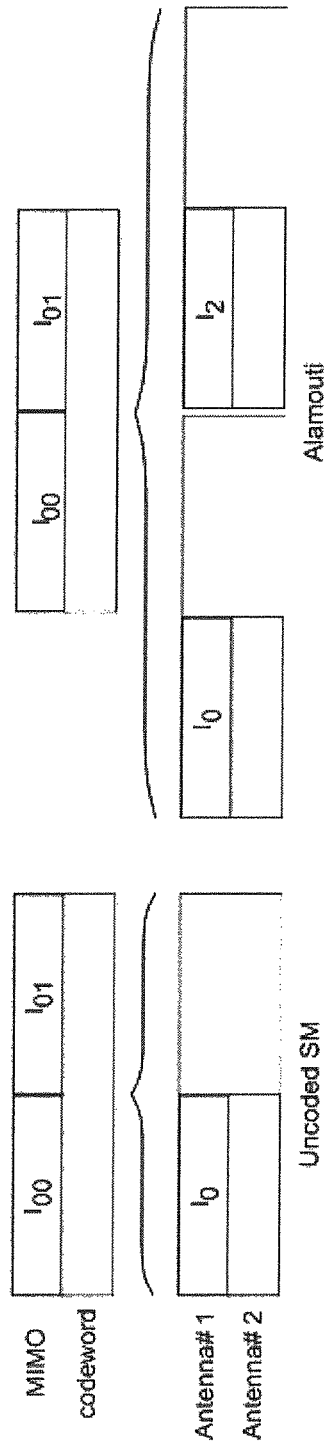
FIG. 7 is a flow diagram illustrating MIMO encoding.

Each MIMO codeword is transmitted over Ntx antennas in T channel uses. This is illustrated in FIG. 7 with Ntx=2 antennas and P=2 QAM symbols for both uncoded spatial multiplexing (SM) where T=1 and Alamouti schemes where T=2.

Figure 8:
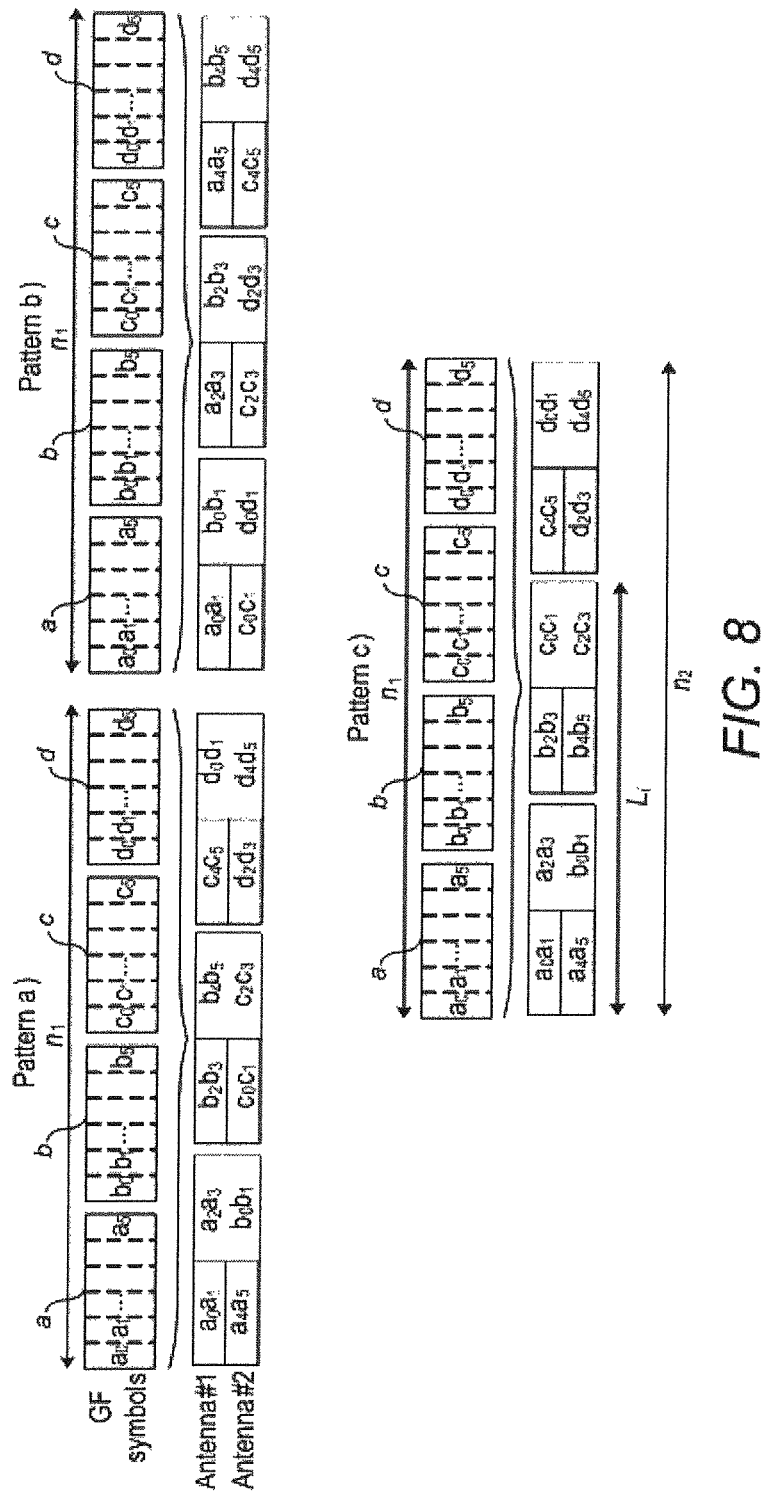
FIG. 8 is a schematic diagram illustrating mapping of Galois symbols in an embodiment of the invention.

For example, in the context of 16QAM where $n_1$=4 and $n_2$=3 (cf. FIG. 6), the lowest interleaver depth is $L_i$=2. We consider an uncoded SM MIMO scheme. Three patterns (a), (b), and (c), are illustrated in FIG. 8. All three patterns respect the first rule by not mixing bits from different GF symbols into the same I or Q component.

Both patterns (a) and (c) respect the second rule by mapping as many IQ components from the same GF symbol as possible into the same GF symbol, whereas Pattern (b) does not follow this rule. Thus in terms of complexity of the ML detector and de-mapper, patterns (a) and (c) allow for the same reduced complexity whereas the complexity in pattern (b) is drastically higher.

In term of inner diversity (i.e. inside the same GF symbol), pattern (a) respects the third rule, whereas pattern (c) does not. Pattern (c) achieves an order equal to 2 to all GF symbols, whereas pattern (a) achieves an order equal to 2 for GF symbols "a" and "d", and 3 for GF symbols "b" and "c", thus in average pattern (a) achieves diversity equal to 2.5. Pattern (b) however achieves the maximum diversity order equal 3 to all GF symbols but at the expense of a breach of the second rule.

Figure 9:
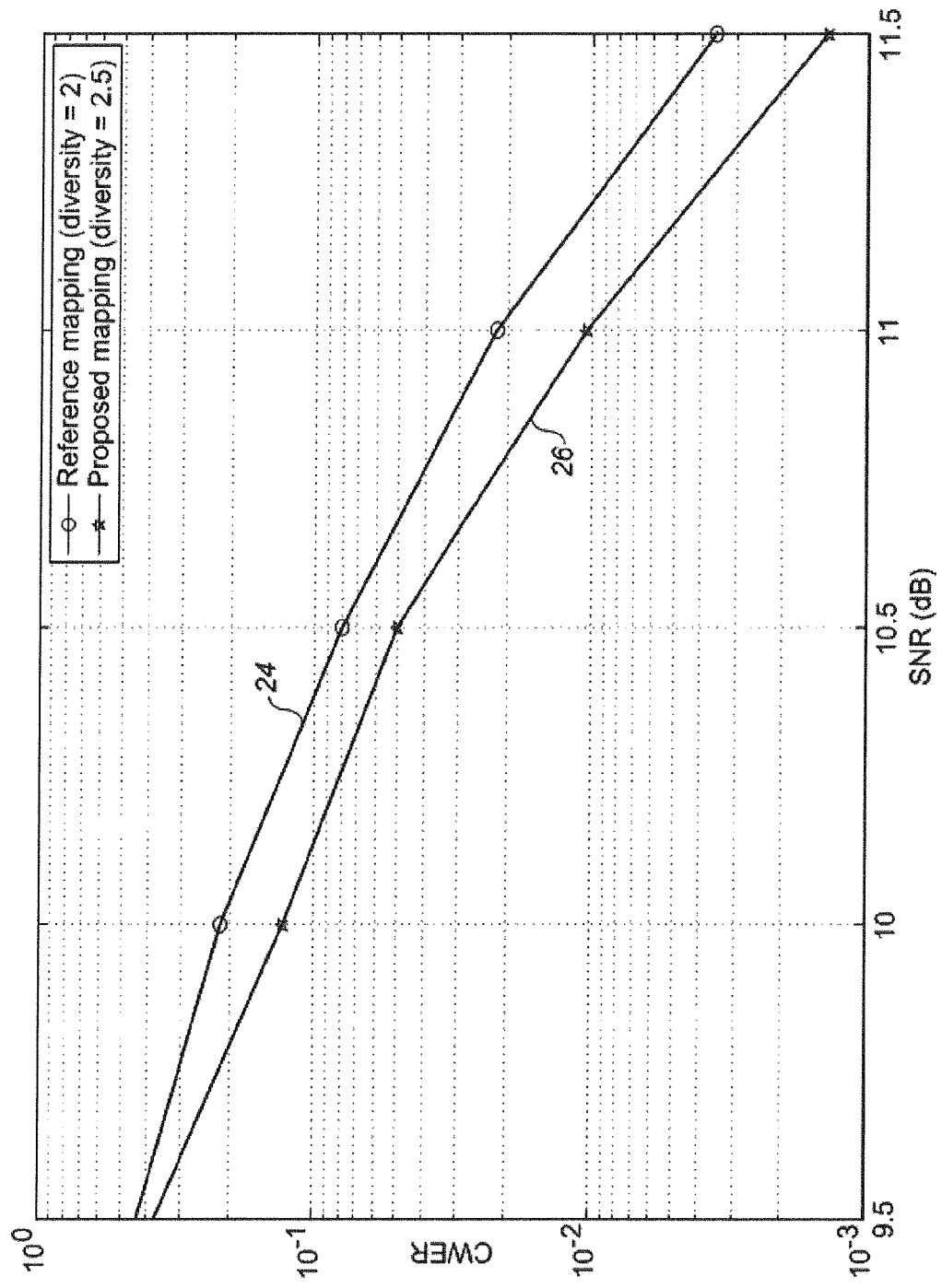
FIG. 9 is a graph illustrating error rate results for different mapping schemes.

FIG. 9 compares the error performance of patterns (a) and (c). Pattern (b) is excluded as it may result in a prohibitive complexity of the ML detector and de-mapper. FIG. 9 shows that the proposed pattern (a) results into better performance 26 (up to 0.25 dB) compared to the performance 24 of pattern (c).

Thus, in summary, by respecting the three rules introduced in embodiments of this invention, mapping patterns are obtained which ensure the best trade-off between performance and complexity. It should be noted that the rules act as design guidelines, and an embodiment of the invention may breach one or more of the rules in order to achieve desired performance.

Figure 10:
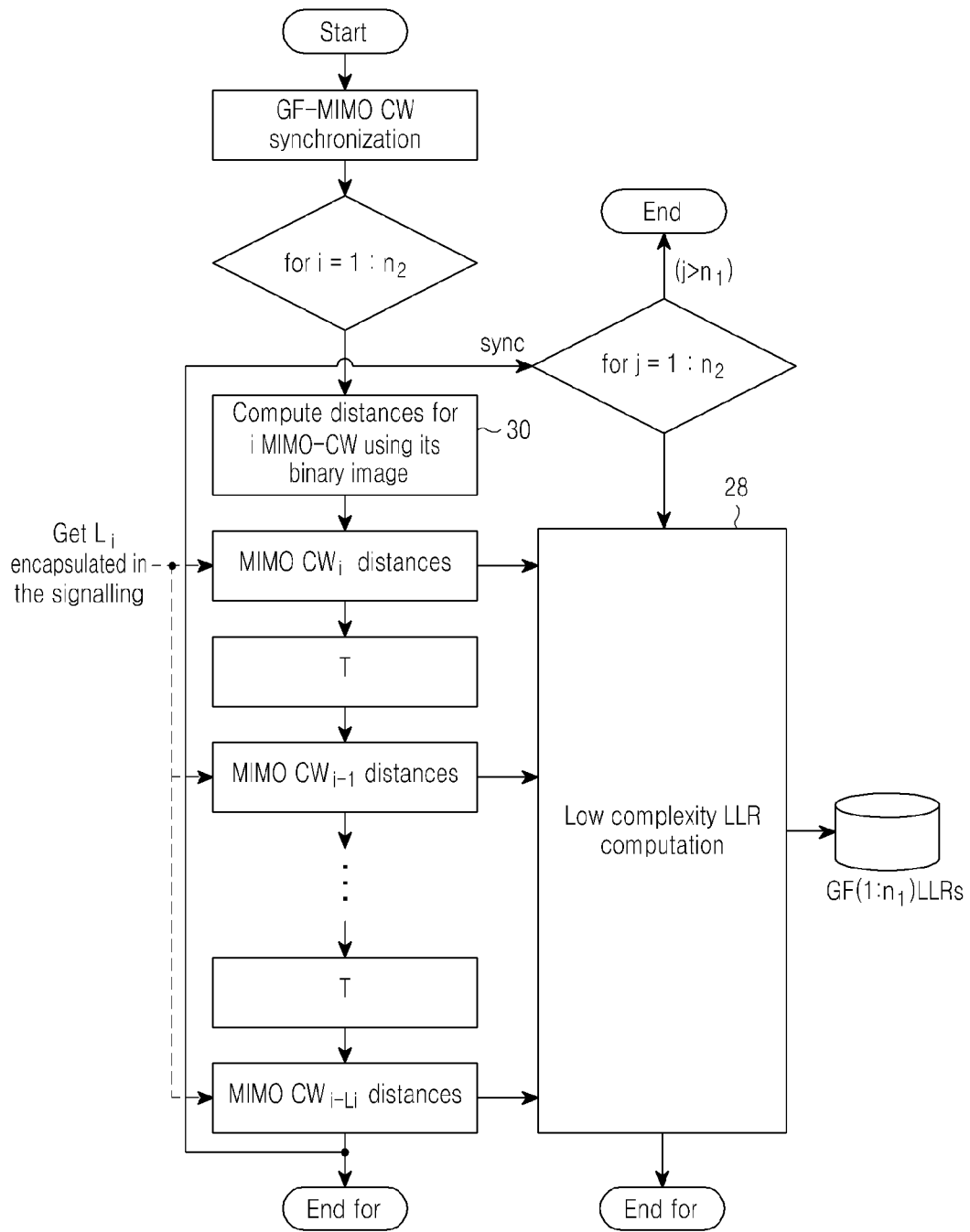
FIG. 10 is a flow diagram illustrating operation of a receiver according to an embodiment of the invention.

FIG. 10 depicts an example flowchart of operations at the receiver side. In an embodiment of the invention, the low complexity Log Likelihood Ratio (LLR) computation 28 is a key feature.

In order to compute the LLRs of the GF symbols, the receiver may perform computation of Maximum Likelihood (ML) distances 30. This may be needed for each individual MIMO codeword. Unlike the binary case, in the non-binary case, one GF symbol may span different MIMO code-words. Thus, for the computation of the LLRs of one GF symbol, there is the need to store the ML distances of the MIMO code-words which carry the binary image of the GF symbol. Thanks to the second rule in the design of the mapper at the transmitter side, which limits the number of MIMO code-words carrying the binary image of one GF symbol to the inner interleaving depth $L_i$, the ML distances of only $L_i$ code-words are then needed for storage in memory to obtain the LLRs of the GF symbol. This reduces the memory needed for storage.

The second step is to determine the N LLR values of each GF symbol, involving the issue of mapping of GF symbols onto the MIMO code-words. As depicted in FIG. 2, depending on the set of parameters (N, M, P), one GF symbol does not necessarily map onto one QAM symbol or later onto one MIMO codeword. This mismatch in the mapping of GF symbols onto MIMO code-words poses a challenge for the computation of the LLRs of the GF symbols.

An alternative currently used in the state of the art is to avoid this problem by selecting the set of parameters (N, M, P) which results into one to one mapping between the GF symbols and MIMO code-words. But this alternative results into very particular cases for use that may be limiting in practical systems. For example, with N=64, M=4 (QPSK), this results in a configuration of P=3 thus 3 antennas for use at the transmitter for SM MIMO scheme; this may not be desirable in practice.

An embodiment of the invention uses an algorithm which may solve the problem for any set of parameters (N,M,P) at low complexity. The algorithm exploits the correlation existing between GF symbols mapped to same MIMO code-word but also any knowledge available on the LLRs of one GF symbol to derive the LLRs of another GF symbol in the same MIMO codeword.

A typical example of a complex scenario is 16QAM where $n_1$=4 GF symbols mapped onto $n_2$=3 MIMO code-words (see FIG. 6). The description that follows relates to the patterns illustrated in FIG. 8, comparing for example, the complexity incurred by pattern (b) and pattern (c).

The table shown in FIG. 14 gives the number of distances (to be summed up together in log-Map case or to be compared together in Max-log-Map case) required for the computation of one LLR of the four GF symbols that are mapped to the three MIMO code-words for both patterns (b) and (c). It is noteworthy that unlike the binary case where only one LLR value is required per GF symbol, here each GF symbol has N LLR values to be computed since we are in the non-binary case with GF order N>2.

If the second rule is applied in the design of the Mapper at the transmitter side, it can be seen that there is a huge complexity reduction achieved by pattern (c) compared to pattern (b).

In order to further reduce the complexity for pattern (c), an embodiment of the invention uses an algorithm, which introduces a complexity control parameter called $N_m$. The algorithm performs the following steps:

At step 1, an initial value of $N_m$ is set. For example, $N_m$=8.

At step 2, for each GF symbol, which the number of distances required for search in the sub-part of the binary image of a GF symbol multiplexed in the same MIMO codeword is lower than $N_m$, the corresponding LLRs are obtained using an exhaustive search over the sub-part of the binary image of the multiplexed GF symbol. In this example, this applies to GF symbol "a" and GF symbol "d", where the number of distances to search equals 4 for the multiplexed GF symbols "b" and "c", respectively.

At step 3, for each remaining GF symbol, a limit is applied to the number of distances to search associated with the sub-part of the binary image of a multiplexed GF symbol which LLR values are obtained in step 2 to the $N_m$ maximum LLR values. This applies to the factor $2^6$ for GF symbol "b" associated with multiplexed GF symbol "a" and GF symbol "c" associated with multiplexed GF symbol "d".

At step 4, for the multiplexed GF symbols which LLR values are not yet obtained in step 2, an exhaustive search is performed or an iterative process can be applied as follows:

At step 4.1, $N_m$ indexes of distances are chosen to search in the sub-part of the binary image of the multiplexed GF symbol. At first iteration, the indexes are chosen randomly. For later iterations, the $N_m$ indexes are the ones corresponding to the maximum $N_m$ LLR values obtained in a previous iteration. In our example, we choose $N_m$=8 out of the $2^4$=16 of the distances to search associated with GF symbol "c" for the computation of the LLRs of GF symbol "b". The same applies to the computation of the LLRs of GF symbol "c".

At step 4.2, the LLRs are computed for the desired GF symbol with the $N_m$ indexes of distances to search in the sub-part of the binary image of the multiplexed GF symbol. Then, step 4.1 is repeated, and the process may continue in an iterative manner.

Figure 11:
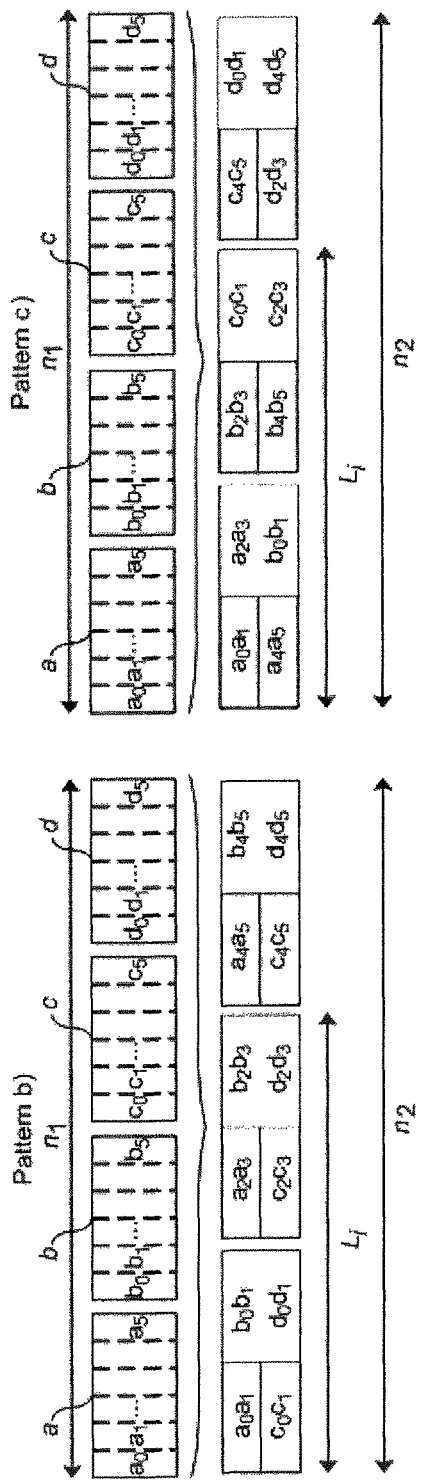
FIG. 11 is a schematic diagram illustrating mapping of Galois symbols in an embodiment of the invention.

The de-mapping process may be further described as follows. The method applies particularly to de-mapping of non-binary GF symbols from physical layer code-words, in which at least one physical layer code-word includes portions mapped from more than one non-binary GF symbol, as shown, for example, in FIG. 11. At least a provisional likelihood estimate is calculated for values of a first non-binary GF symbol having at least portions within a first physical layer code-word, the calculating including selecting a first number of values of a second non-binary GF symbol having at least portions within the first physical layer code-word, the first number forming a subset of the possible values of the second non-binary GF symbol. This may correspond, for example, to step 4 of the de-mapping process, where the first symbol is for example symbol "b" of pattern (c) in FIG. 11, and the second symbol is symbol "c" of pattern (c) in FIG. 11.

As a further part of the de-mapping process, at least a provisional likelihood estimate may be calculated for values of the second non-binary GF symbol including selecting a second number of values of the first non-binary GF symbol, the second number forming a more likely (e.g., having a higher likelihood estimate) subset of the possible values of the first non-binary GF symbol, based on the at least a provisional likelihood estimate for values of the first non-binary GF symbol. This may correspond to subsequent iteration of step 4.

As yet another part of the de-mapping process, at least part of a provisional likelihood estimate is estimated for values of the first non-binary GF symbol including selecting a third number of values of the second non-binary GF symbol, the third number forming a more likely subset of the possible values of the second non-binary GF symbol, based on the at least a provisional likelihood estimate for values of the second non-binary GF symbol. This may represent a further iteration of step 4.

In the above description, the first, second, and third numbers may be the same, in the case of the example of step 4, the numbers are $N_m$, in that example 8. Each value of a GF symbol is associated with a distance, that is, a Euclidean distance.

Depending on a determination that a likelihood estimate is available for each of the total number of different values that the second GF symbol may have, the method includes selecting a subset of more likely values as the first number of values of the second non-binary GF symbol. This may correspond to the selection of the maximum log likelihood ratio values obtained in a previous iteration as in step 4.1.

Depending on a determination that a likelihood estimate is not available for a value that the second GF symbol may have, the method includes selecting a subset of pseudo-random values as the first number of values of the second non-binary GF symbol. The pseudo-random selection may be an example of the random selection at a first iteration of step 4.1. The determination as to whether or not a likelihood estimate is available, may be done, for example, on the basis of whether an iteration is a first or subsequent iteration.

It will be understood that reference to MIMO code-words in the description of steps 1 to 4 could also apply to other physical layer code-words, such as constellation symbols. This may apply, for example, to a non-MIMO, single-input single output system.

Figure 12:
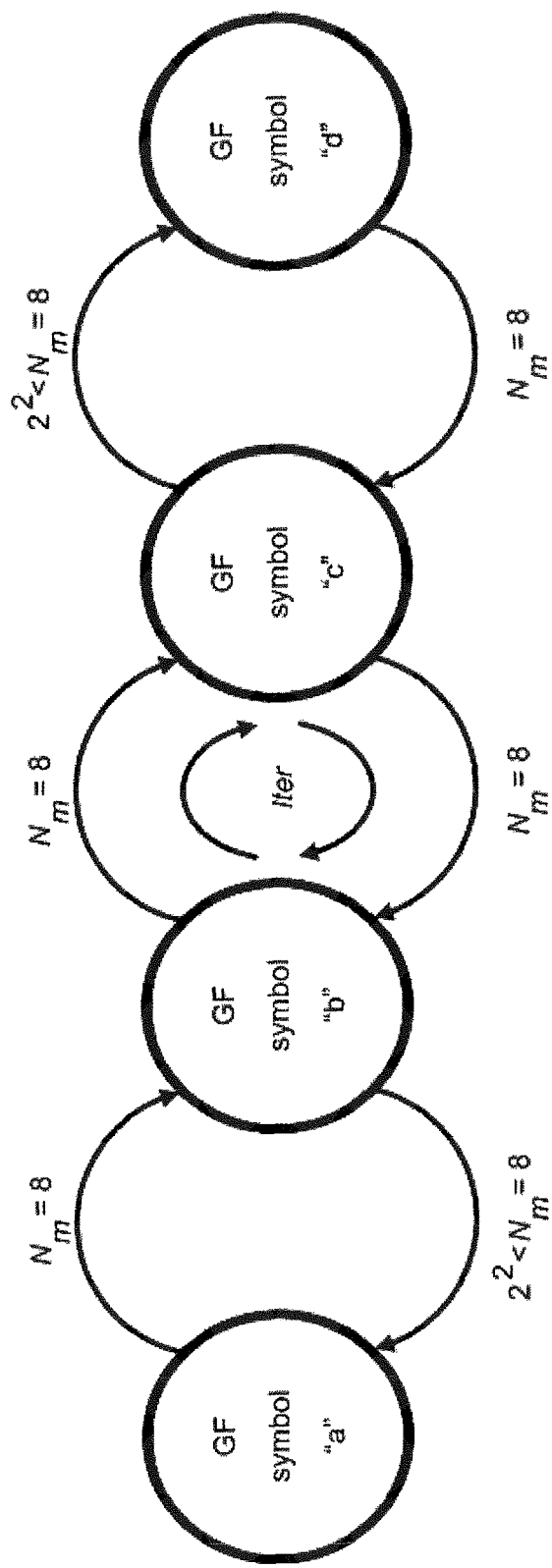
FIG. 12 is a schematic diagram illustrating a low complexity likelihood calculation in an embodiment of the invention.

The operation of the method of de-mapping is illustrated in FIG. 12. As a result of iterations of the algorithm, the complexity of LLR computation for pattern (c) reduces as shown in FIG. 15.

Figure 13:
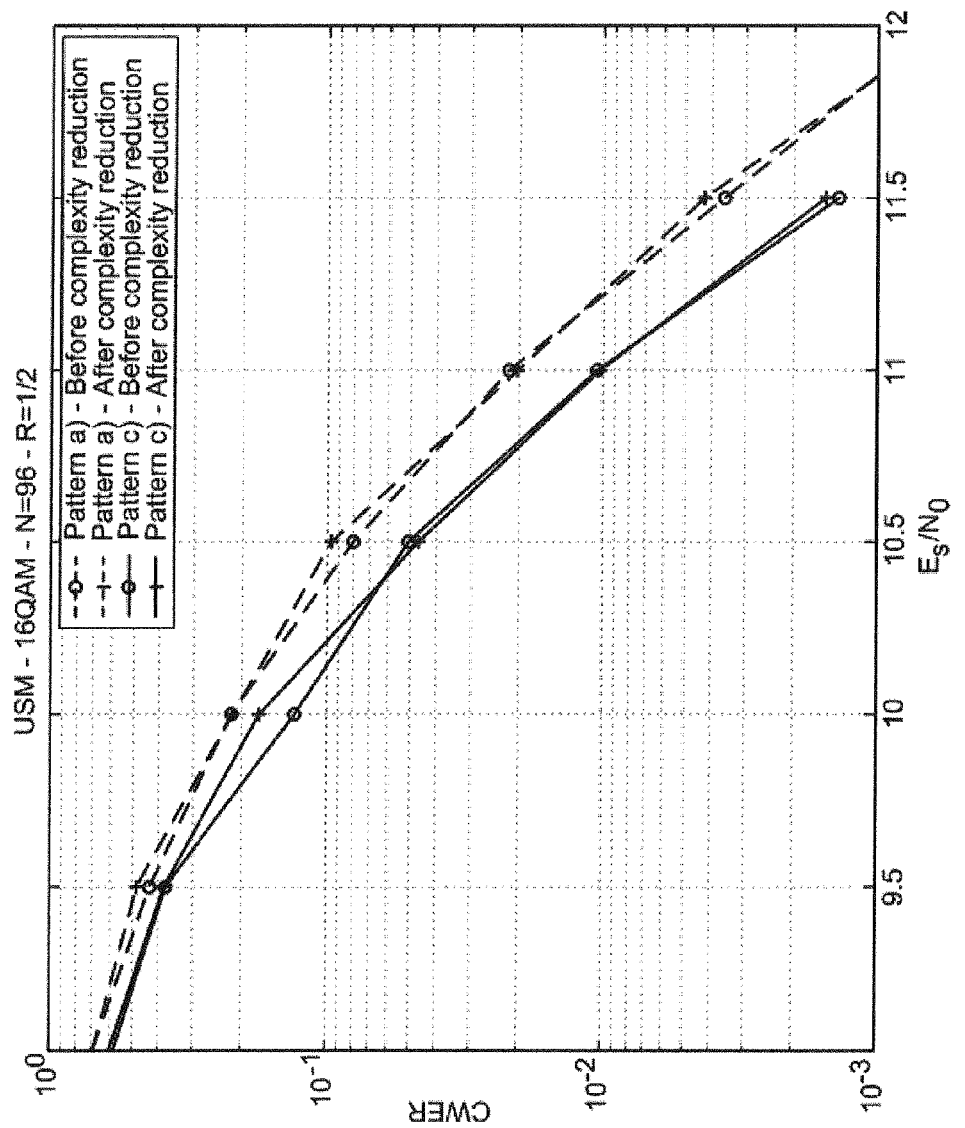
FIG. 13 is a graph illustrating error rate results for different mapping schemes.

FIG. 13 illustrates the error performance of patterns (a) and (c) (from FIG. 8) before and after further complexity reduction of the LLR computation using the above algorithm. Results are shown without an iterative process. The performance shows very slight degradation in performance, which reflects the accuracy of the proposed algorithm.

So, it can be seen that an embodiment of the invention introduces features at least with the respect to the design of the mapper mapping the GF symbols onto QAM/MIMO code-words at the transmitter side, including the three rules for the design of the mapper allowing for the best trade-off between complexity and performance.

At the receiver side, an embodiment of the invention introduces at least a de-mapping scheme for the computation of the LLR values of the GF symbols with lower complexity.

So, it can be seen that, compared to existing technology, an embodiment of the invention may have the following advantages: firstly, mapping for GF symbols onto MIMO code-words achieving an improved trade-off between the error performance and complexity; secondly, significant complexity reduction in the computation of the LLR values at the receiver at very slight degradation in the performance; and thirdly a wide variety of practical configurations may be achieved in terms of GF order, constellation size, and MIMO scheme and antenna configurations for the use in the system.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims and their equivalents.

What is claimed is:

1. A method of de-mapping non-binary Galois field symbols from physical layer code-words in a data communication system, in which at least one physical layer code-word includes portions mapped from more than one non-binary Galois field symbol, the method comprising:

calculating at least one provisional likelihood estimate for values of a first non-binary Galois field symbol having at least portions within a first physical layer code-word, the calculating including selecting a first number of values of a second non-binary Galois field symbol having at least portions within the first physical layer code-word, the first number of values forming a subset of possible values of the second non-binary Galois field symbol.

2. The method of claim 1, further comprising:

calculating at least one provisional likelihood estimate for values of the second non-binary Galois field symbol including selecting a second number of values of the first non-binary Galois field symbol, the second number of values forming a more likely subset of possible values of the first non-binary Galois field symbol, based on the at least one provisional likelihood estimate for values of the first non-binary Galois field symbol.

3. The method of claim 2, further comprising:
estimating at least one provisional likelihood estimate for values of the first non-binary Galois field symbol including selecting a third number of values of the second non-binary Galois field symbol, the third number of values forming a more likely subset of possible values of the second non-binary Galois field symbol, based on the at least one provisional likelihood estimate for values of the second non-binary Galois field symbol.

4. The method of claim 3, wherein the first number of values, the second number of values, and the third number of values are identical.

5. The method of claim 1, wherein, depending on a determination that a likelihood estimate is available for each of a total number of different values that the second Galois field symbol may have, the method includes selecting a subset of more likely values as the first number of values of the second non-binary Galois field symbol.

6. The method of claim 1, wherein, depending on a determination that a likelihood estimate is not available for a value that the second non-binary Galois field symbol may have, the method includes selecting a subset of pseudo-random values as the first number of values of the second non-binary Galois field symbol.

7. The method of claim 1, wherein the at least one physical layer code-word comprises one or more constellation symbols.

8. The method of claim 1, wherein the at least one physical layer code-word is a Multiple-Input Multiple-Output (MIMO) code-word.

9. The method of claim 1, wherein the at least one provisional likelihood estimate are derived including Euclidean distances derived using a maximum likelihood detector.

10. A receiving apparatus for de-mapping non-binary Galois field symbols from physical layer code-words in a data communication system, in which at least one physical layer code-word includes portions mapped from more than one non-binary Galois field symbol, the apparatus comprising:
a Multiple-Input Multiple-Output (MIMO) detector and demapper configured for calculating at least one provisional likelihood estimate for values of a first non-binary Galois field symbol having at least portions within a first physical layer code-word, the calculating including selecting a first number of values of a second non-binary Galois field symbol having at least portions within the first physical layer code-word, the first number of values forming a subset of possible values of the second non-binary Galois field symbol.

11. A method of mapping non-binary Galois field symbols onto constellation symbols in a data communication system, each constellation symbol having an In-phase and Quadrature component, the method comprising:
allowing mapping of at least a part of each of a plurality of non-binary Galois field symbols onto one constellation symbol; and
when mapping at least a part of each of a first non-binary Galois field symbol and a second non-binary Galois field symbol onto a given constellation symbol, controlling the mapping to ensure that the at least a part of the first non-binary Galois field symbol and the at least a part of the second non-binary Galois field symbol are not both mapped onto a given In-phase or Quadrature component of the given constellation symbol.

12. The method of claim 11, wherein:

$K=q*L+r$ where K represents the length in bits of a Galois field symbol, L represents the half-length in bits of a constellation symbol, the quotient q represents how many In-phase and Quadrature components a Galois field symbol will map to, and the remainder r represents how many bits will be carried in part of an In-phase or Quadrature component after other bits from the Galois symbol have been mapped to all of one or more In-phase and Quadrature components.

13. The method of claim 12, wherein:

$L \geq 2$.

14. The method of claim 12, wherein r=0 and the at least a part of the first non-binary Galois field symbol is mapped to the given In-phase or Quadrature component of the given constellation symbol and not to other of the In-phase or Quadrature components of the given constellation symbol,
and wherein the at least a part of the second non-binary Galois field symbol is mapped to only the other of the In-phase or Quadrature component of the given constellation symbol and not to the given In-phase or Quadrature component of the given constellation symbol.

15. The method of claim 12, wherein r>0 and the at least a part of the first non-binary Galois field symbol is mapped to the given In-phase or Quadrature component of the given constellation symbol and to other of the In-phase or Quadrature components of the given constellation symbol,
and wherein the at least a part of the second non-binary Galois field symbol is mapped to only the other of the In-phase or Quadrature components of the given constellation symbol and not to the given In-phase or Quadrature components of the given constellation symbol.

16. The method of claim 11, wherein the first and second non-binary Galois field symbols form part of a same non-binary forward error correction code-word.

17. The method of claim 11, further comprising:
allowing the mapping of at least a part of each of three or more non-binary Galois field symbols onto two constellation symbols; and
when mapping of at least a part of each of the second non-binary Galois field symbol and a third non-binary Galois field symbol onto a further constellation symbol, controlling the mapping to ensure that the at least a part of the second non-binary Galois field symbol and the at least a part of the third non-binary Galois field symbol are not both mapped onto a given In-phase or Quadrature component of the further constellation symbol.

18. The method of claim 11, further comprising:
mapping the first non-binary Galois field symbol to a plurality of constellation symbols.

19. The method of claim 18, wherein the first and second non-binary Galois field symbols are of a length which is greater than or equal to half of a length of the given constellation symbol.

20. The method of claim 19, wherein the first and second non-binary Galois field symbols are of a length which is a multiple integral plus one half of a length of the given constellation symbol.

21. The method of claim 11, further comprising:
mapping the non-binary Galois field symbols onto physical layer code-words, the mapping onto physical layer code-words including:
allowing the mapping of a non-binary Galois field symbol onto a plurality of physical layer code-words; and
when there is an option to map a non-binary Galois field symbol onto a fourth number of physical layer codewords or a fifth number of physical layer code-words, preferentially mapping the Galois field symbol onto the fourth number of physical layer code-words, wherein the fourth number of physical layer code-words is smaller than the fifth number of physical layer code-words.

22. The method of claim 21, wherein each of the physical layer code-words comprises one or more constellation symbols.

23. The method of claim 21, wherein each of the physical layer code-words is a Multiple-Input Multiple-Output code-word, 24. The method of claim 11, further comprising:

mapping the non-binary Galois field symbols onto one or more diversity cells, wherein the mapping onto one or more diversity cells including:

allowing the mapping of a non-binary Galois field symbol onto a plurality of diversity cells: and when there is an option to map a non-binary Galois field symbol onto a sixth number of diversity cells or a seventh number of diversity cells, preferentially mapping the non-binary Galois field symbol onto the seventh number of diversity cells wherein the seventh number of diversity cells is greater than the sixth number of diversity cells.

25. The method of claim 24, wherein a diversity cell is defined in terms of spatial, polarization, time or frequency diversity.

26. The method of claim 17, further comprising:

using an interleaver to perform the mapping and the non-binary Galois field symbols comprise a predetermined number of bits; and setting the interleaver to a value which limits the number of physical layer code-words onto which the non-binary Galois field symbol is mapped to a number of physical layer code-words less than the number of bits in the non-binary Galois field symbol.

27. The method of claim 17, further comprising:

using an interleaver to perform the mapping and the non-binary Galois field symbols comprise a predetermined number of bits; and setting the interleaver to a value which tends to limit the number of physical layer code-words onto which the non-binary Galois field symbol is mapped to a number of physical layer code-words less than half the number of bits in the non-binary Galois field symbol.

28. The method of claim 27, wherein the value is a maximum number of physical layer code-words onto which the non-binary Galois field symbol is mapped.

29. The method of claim 28, wherein the value is set at two.

30. A transmitting apparatus for mapping non-binary Galois field symbols onto constellation symbols in a data communication system, each constellation symbol having an In-phase and Quadrature component, the apparatus comprising:

a mapper configured for allowing mapping of at least a part of each of a plurality of non-binary Galois field symbol onto one constellation symbol, and when mapping at least a part of each of a first non-binary Galois field symbol and a second non-binary Galois field symbol onto a given constellation symbol, controlling the mapping to ensure that the at least a part of the first non-binary Galois field symbol and the at least a part of the second non-binary Galois field symbol are not both mapped onto a given In-phase or Quadrature component of the given constellation symbol.

31. A method of mapping non-binary Galois field symbols onto one or more diversity cells, the method comprising:

allowing the mapping of a non-binary Galois field symbol onto a plurality of diversity cells; and when there is an option to map a non-binary Galois field symbol onto a first number of diversity cells or a second number of diversity cells, preferentially mapping the non-binary Galois field symbol onto the second number of diversity cells, wherein the second number of diversity cells is greater than the first number of diversity cells.

32. The method of claim 31, wherein the diversity cells are cells of one or more Multiple-Input Multiple-Output code-words, the diversity cells being transmitted by two or more antennas, different diversity cells being transmitted by different antennas, and wherein the method comprises preferentially mapping the non-binary Galois field symbol onto diversity cells transmitted by each of the two or more antennas.

33. The method of claim 31, wherein the diversity cells are defined in terms of spatial, polarization, time or frequency diversity.

34. A transmitting apparatus for mapping non-binary Galois field symbols onto one or more diversity cells, the apparatus comprising:

a mapper configured for allowing the mapping of a non-binary Galois field symbol onto a plurality of diversity cells; and when there is an option to map a non-binary Galois field symbol onto a first number of diversity cells or a second number of diversity cells, preferentially mapping the non-binary Galois field symbol onto the second number of diversity cells, wherein the second number of diversity cells is greater than the first number of diversity cells.

* * * * *